Oct. 17, 1967     M. B. HOLLANDER     3,346,947
FRICTION WELDING
Filed July 10, 1963

INVENTOR
MILTON BERNARD HOLLANDER

United States Patent Office 3,346,947
Patented Oct. 17, 1967

3,346,947
FRICTION WELDING
Milton Bernard Hollander, Stamford, Conn., assignor to American Machine & Foundry Company, a corporation of New Jersey
Filed July 10, 1963, Ser. No. 293,933
2 Claims. (Cl. 29—470.3)

This invention relates in general to friction welding, and, more particularly, to the friction welding of copper workpieces to aluminum workpieces. Here aluminum includes pure aluminum as well as aluminum alloys.

Commercial grades of copper may be friction welded to commercial grades of aluminum using an inertia friction welding apparatus. Elements fabricated by friction welding copper to aluminum may be used as transition joints, with the friction welded joint being stronger than any possible mechanical and brazing bond.

A main object of this invention is to friction weld copper to aluminum workpieces. This and other objects, advantages and features of invention will become apparent from the following description and accompanying drawing wherein.

Figure 1:
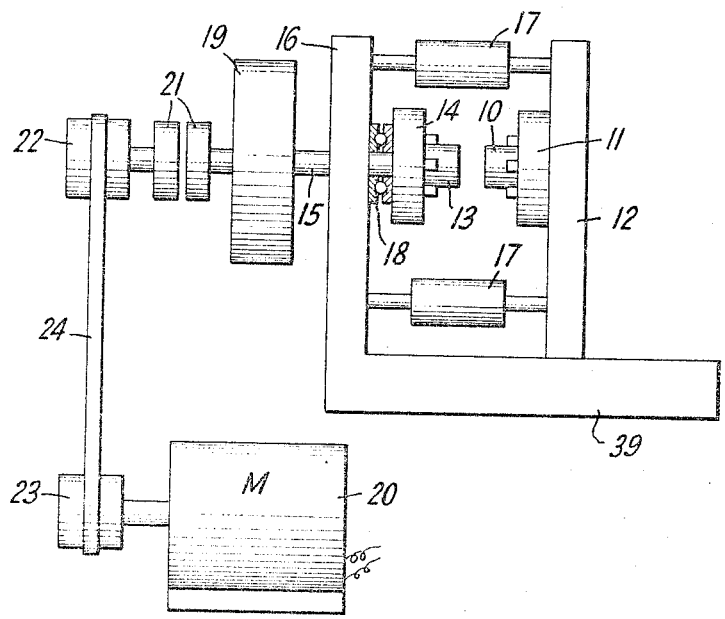
FIGURE 1 is a schematic drawing of an inertia friction welding apparatus.

Referring to the drawing in detail, FIGURE 1 shows a flywheel or inertia welding apparatus in which a first copper workpiece 10 is held in a stationary chuck 11 fixed to the vertical frame member 12 slidably mounted on the machine base 39. An aluminum workpiece 13 is placed in a rotatably mounted chuck 14 fixed to shaft 15 which passes through the stationary vertical member 16. Of course, the mounting of the workpieces is interchangeable. Hydraulic cylinders 17 are connected between the members 12 and 16 to draw them toward each other. A thrust bearing 18 takes up the axial load from the rotating chuck 14. A flywheel 19 is fixed on shaft 15 which is driven by a motor 20 through a clutch 21 by means of the pulleys 22 and 23 and a belt 24.

Figure 2:
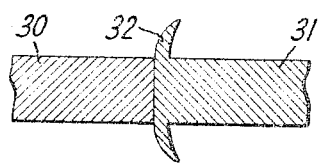
FIGURE 2 is a longitudinal section through fragments of a copper and an aluminum rod workpiece after having been friction welded through too long a period of time.

To friction weld copper and aluminum workpieces 10 and 13, about 6,500 foot pounds of energy should be delivered to the weld for each square inch of weld area for butt welding. For stud to plate type welding, two to three times this energy may be required. This energy should be delivered in less than ten seconds, preferably in two seconds or less. Since copper is a better conductor of heat, if the total required energy is delivered through too long a period of time, i.e., for more than ten seconds, a weld such as that shown in FIGURE 2 will result. Here, the rate of heat generated in the weld area is so low that the copper workpiece 30 conducts the heat generated away from the weld area so that all the upset 32 flows from the aluminum workpiece 31. This produces a relatively unsatisfactory weld.

Figure 3:
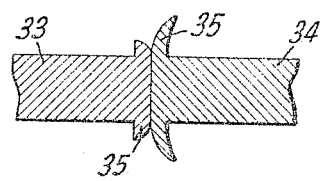
FIGURE 3 is a longitudinal section through fragments of a copper and an aluminum rod friction welded in a sufficiently short period of time according to this invention.

Since an inertia friction welding apparatus completes a weld much faster and yields equal or better weld quality than conventional friction welding apparatus, the weld of this invention is most easily made using an inertia friction welding apparatus. As shown in FIGURE 3, if the weld is made in less than two seconds there is insufficient time for the copper workpiece 33 to conduct the great quantity of heat generated in the weld area away from the weld area. This tends to equalize the upset 35 produced from both the copper workpiece 33 and the aluminum workpiece 34 and produces a superior weld.

To make the weld, the workpieces should be forced together with a pressure from 5,000 pounds per square inch of weld area up to the ultimate strength of the weaker workpiece. Excellent welds have been obtained using a welding pressure of 30,000 pounds per square inch, for friction welding E.T.P. copper to 6061–T6 aluminum.

Welds can be made with the energy put into the weld varying from 3,000 to 30,000 foot pounds of energy released in the weld area for each square inch of weld area, but the greater amount of energy may result in the production of too much upset for some applications.

Figure 4:
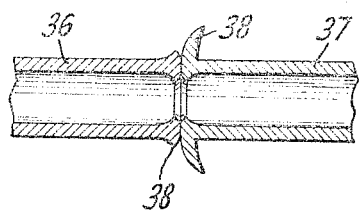
FIGURE 4 is a longitudinal section through fragments of a copper and an aluminum tube friction welded according to this invention.

FIGURE 4 shows two pieces of tubing 36 and 37 of copper and aluminum friction welded according to this invention in less than two seconds to produce the moderate and equal amount of upset 38. A weld of this sort serves as an excellent transition piece between copper and aluminum tubing.

The aforementioned limits substantially hold true for friction welds from $\frac{1}{100}$ square inch in weld area to over 10 square inches in weld area.

While this invention has been shown and described in the best forms known, it will nevertheless be understood that these are purely exemplary and that modifications may be made without departing from the spirit and scope of the invention except as it may be more limited in the appended claims.

What is claimed is:

1. The method of friction welding aluminum and copper workpieces comprising the steps of rotating the workpieces relative to each other, forcing the workpieces together so that between 3,000 and 30,000 foot pounds of energy are released in the weld area for each square inch of weld area, and rapidly stopping the relative rotation of the workpieces to complete the weld in less than ten seconds.

2. The method of friction welding aluminum and copper workpieces comprising establishing rotation of one of said workpieces and a coupled flywheel so that their combined mass stores the requisite quantity of energy between about 3,000 and about 30,000 foot pounds to be subsequently released as welding heat, for each square inch of weld area, forcing the workpieces together with a pressure of over 5,000 pounds per square inch of weld area to decelerate and stop the rotating workpiece and its coupled flywheel in less than ten seconds and thereby forge the workpieces together.

References Cited

UNITED STATES PATENTS

| | | | |
|---|---|---|---|
| 3,126,625 | 3/1964 | Laing | 29—470.3 |
| 3,134,169 | 5/1964 | Hollander et al. | 29—470.3 |
| 3,134,278 | 5/1964 | Hollander et al. | 29—470.3 |
| 3,175,284 | 3/1965 | Cotovsky | 29—470.3 |

JOHN F. CAMPBELL, *Primary Examiner.*